US007970543B2

(12) United States Patent
Powell et al.

(10) Patent No.: US 7,970,543 B2
(45) Date of Patent: Jun. 28, 2011

(54) PREDICTING TROPICAL CYCLONE DESTRUCTIVE POTENTIAL BY INTEGRATED KINETIC ENERGY ACCORDING TO THE POWELL/REINHOLD SCALE

(75) Inventors: Mark D. Powell, Coconut Grove, FL (US); Timothy A. Reinhold, Tampa, FL (US)

(73) Assignee: The United States of America, represented by the Secretary of Commerce, Washington, DC (US)

( * ) Notice: Subject to any disclaimer, the term of this patent is extended or adjusted under 35 U.S.C. 154(b) by 380 days.

(21) Appl. No.: 12/050,836

(22) Filed: Mar. 18, 2008

(65) Prior Publication Data

US 2009/0240352 A1    Sep. 24, 2009

(51) Int. Cl.
*G01W 1/10* (2006.01)
*G06F 17/40* (2006.01)
(52) U.S. Cl. .................................... 702/9; 702/1; 703/5
(58) Field of Classification Search .................. 702/3, 1, 702/41
See application file for complete search history.

(56) References Cited

U.S. PATENT DOCUMENTS

| | | | |
|---|---|---|---|
| 2007/0168155 A1* | 7/2007 | Ravela et al. ................. | 702/179 |
| 2007/0185653 A1* | 8/2007 | Bresch et al. ..................... | 702/3 |
| 2007/0223841 A1* | 9/2007 | Weinzapfel et al. ........... | 382/325 |
| 2007/0225915 A1* | 9/2007 | Weinzapfel et al. .............. | 702/3 |
| 2008/0082268 A1* | 4/2008 | Soloviev et al. .................. | 702/3 |

OTHER PUBLICATIONS

L. Kantha; Eos, vol. 87, No. 1, Time to Replace the Saffir-Simpson Hurricane Scale; Jan. 3, 2006; 2 pages.
ASCE Standard; ASCE/SEI 7-05; Minimum Design Loads for Building and Other Structures; 419 pages, 2006.
Gerald D. Bell et al.; Climate Assessment for 1999; Bulletin of the American Meteorological Society; vol. 81, No. 6, Jun. 2000; pp. S1-S50.
M Bister et al.; Dissipative Heating and Hurricne Intensity; Meteorol. Atmos. Phys. 65; 1998; pp. 233-240.
Steven Businger et al; Viscous Dissipation of Turbulence Kinetic Energy in Storms; American Meteorological Society; vol. 58; Dec. 2001; pp. 3793-3796.
Isaac M. Cline; Monthly Weather Review; vol. 48, No. 3; Mar. 1920; pp. 127-146.
Debra L. Combs et al; Deaths Related to Hurricane Andrew in Florida and Louisiana, 1992; vol. 25, No. 3; 1996; Hurricane-Related Deaths; pp. 537-544.
Mark Croxford et al; Inner Core Strength of Atlantic Tropical Cyclones; 2002 American Meteorological Society; vol. 130; pp. 127-139.
M. A. Donelan et al; Geophysical Research Letters, vol. 31, L18306, doi:10.1029/2004GL019460; American Geophysical Union; 2004; pp. L18306, pp. 1-5.
Chistopher Velden et al; The Dvorak Tropical Cyclone Intensity Estimation Technique; American Meteorological Society; Sep. 2006; pp. 1195-1210.

(Continued)

*Primary Examiner* — Hal D Wachsman
(74) *Attorney, Agent, or Firm* — Novak Druce + Quigg LLP

(57) ABSTRACT

A method of predicting the destructive capacity of a tropical cyclone based on a new Wind Destructive Potential (WDP) and Storm Surge Destructive Potential (SDP) scales which provide a manner to rate the severity of hurricanes and typhoons, based on information provided in operational forecast and warning products, experimental wind field products, or gridded numerical weather prediction model outputs. These new scales are formulated to be consistent with the physical mechanism through which tropical cyclones impact coastal communities through wind, storm surges and wave damage.

19 Claims, 9 Drawing Sheets

OTHER PUBLICATIONS

Kerry Emanuel; Increasing destructiveness of tropical cyclones over the past 30 years; vol. 436; Nature Publishing Group; Aug. 2005; pp. 686-688.
James L. Franklin et al; Weather and Forcasting; GPS Dropwindsonde Wind Profiles in Hurricanes and Their Operational . . . ; vol. 18; Feb. 2003; pp. 32-44.
R.A. Howard et al; The Decision to Seed Hurricanes; Science; vol. 176; Jun. 16, 1972; pp. 1191-1202.
M.S. Longuet-Higgins et al; Radiation Stresses in water waves; a physical discussion, with applications; p-Sea Research; Pergamon Press Ltd.; vol. 11; pp. 529-562; 1964.
M. Mahendran; Cyclone Intensity Categories; Weather and Forecasting; American Meteorological Society; vol. 13; Sep. 1998; pp. 878-883.
Dennis S. Mileti et al; Warnings during Disaster: Normalizing Communicated Risk; Social Problems; vol. 39, No. 1; Feb. 1992; 40-57.
William D. Nordhaus; The Economics of Hurricanes in the United States; Jul. 27, 2006; 33 pages.
Mark D. Powell et al; Hurricane Andrew's Landfall in South Florida. Part 1: Standardizing Measurements . . . ; American Meteorological Society; vol. 11; 1996; pp. 304-328.
Mark D. Powell et al; Tropical Cyclone Destructive Potential by Integrated Kinetic Energy; BAMS; Apr. 2007; pp. 513-526.
Mark D. Powell et al; The HRD real-time hurricane wind analysis system; Journal of Wind Engineering and Industrial Aerodynamics 77&78; 1998; pp. 53-64.
Mark D. Powell et al; Reduced drag coefficient for high wind speeds in tropical cyclones; Nature Publishing Group; vol. 422, Mar. 20, 2003; pp. 279-283.
Robert J. Weaver; Effect of Wave Forces on Storm Surge; 2004; 75 pages.
Department of Economic and Social Affairs; Low-Cost Construction Resistant to Earthquakes and Hurricanes; 1975; 7 pages.
James M. Shultz et al; Epidemiology of Tropical Cyclones: The Dynamics of Disaster, Disease, and Development; Epidemiol Rev; vol. 27; 2005; pp. 21-35.
Lloyd J. Shaprio; The Asymmetric Boundary Layer Flow Under a Translating Hurricane; Journal of the Atmospheric Sciences; vol. 40; Aug. 1983; pp. 1984-1998.
Robert Simpson et al; Tropical Cyclone Destructive Potential by Integrated Kinetic Energy; American Meteorological Society; Nov. 2007; pp. 1799-1800.
Eric W. Uhlhorn et al; Verification of Remotely Sensed Sea Surface Winds in Hurricanes; American Meteorological Society; Jan. 2003; vol. 30; pp. 99-116.
Candis L. Weatherford et al. Typhoon Structure as Revealed by Aircraft Reconnaissance; American Meteorological Society; vol. 116; May 1988; pp. 1032-1043.
P.J. Webster et al; Changes in Tropical Cyclone Number, Duration, and Intensity . . . Science; vol. 309; Sep. 2005; pp. 1843-1846.
National Weather Service Manual 10-604; Jun. 1, 2006; pp. 1-9.

* cited by examiner

Fig 1 a) Hurricane Camille 0430 UTC 18 AUG 1969
Max 1-min sustained surface winds (kt)
Valid for marine exposure over water, open terrain exposure over land
Analysis based on I from 0430 – 0430 z 4 from 0000-0600z S from 2115-2330 z
2 from 1954 -0658z
0430z User fix msip = 909.0 mb

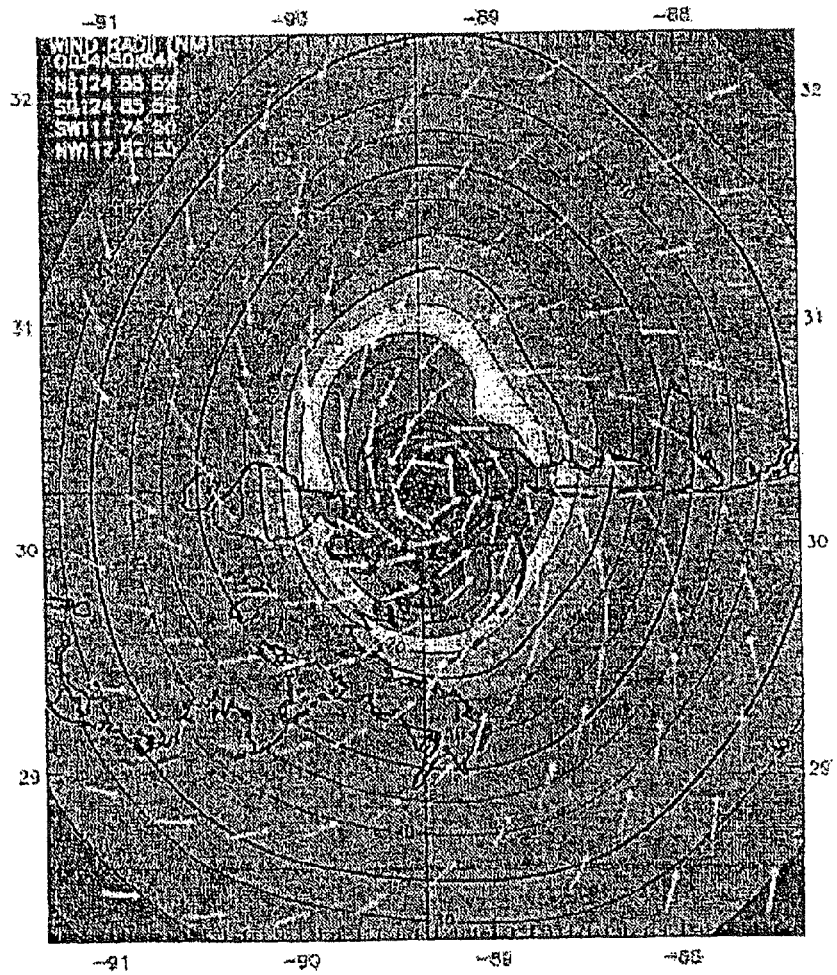

Observed Max. Surface Wind: 129 kts. 8 nm NE of center based on 0430 z1 sfc measurement
Analyzed max Wind: 127 kts, 7nm NE of center Experimental research of NOAA/ AOML/ Hurricane Research Division Fig 1b)   Hurricane Katrina 1200 UTC 28 AUG 2005
Max 1 min-sustained surface winds (kt)
Valid for marine exposure over water, open terrain exposure over land
Anaylsis based on CMAN from 0900 – 1500z, AFREC from 0907 – 1459 z
OSCAT from 1125-1128z, SHIP from 1208-1312 z
MESONET from 1418-1458 z, GPSSONDE_WL150 FROM 0900-1458z
METAR from 0915-1500 z ASOS from 0904-1500 z
MOORED_BUOY from 0909-1459z
    1200 z position interpolated from 1104 Army Corps; msib = 908.0 mb

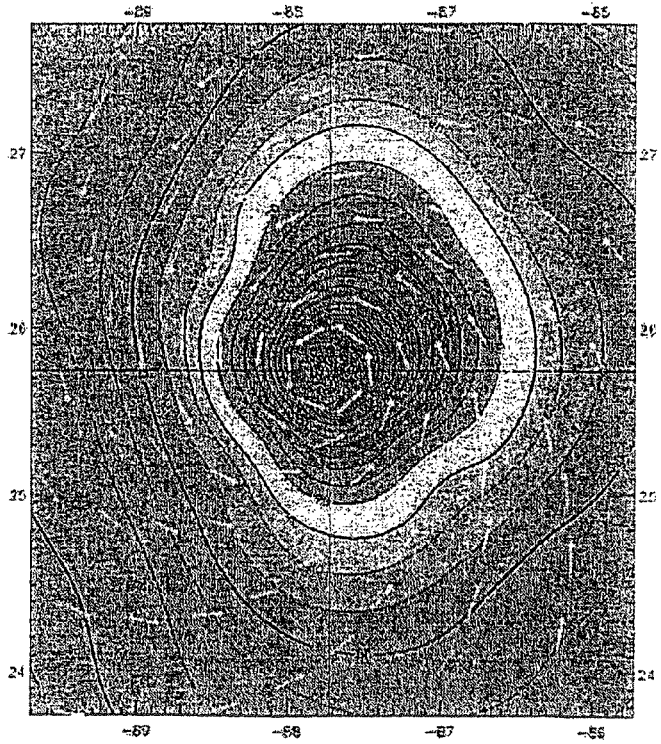

Observed Max. Surface Wind: 139 kts, 14 nm NE of center based on 1432 z AFREC stc measurement
Analyzed Max. Wind: 139 kts, 14nm NE of center
Experimental research product of NOAA / AOML / Hurricane Research Division Fig 1 c)   Hurricane Katrina 1200 UTC 29 AUG 2005
Max 1-min sustained surface winds (tk)
Valid for marine exposure over water, open terrain exposure over land Observed Max. Surface Wind: 102 kts, 35 nm SE of center based on 1020z TAIL_DOPPLER43 sfc measurement
Analyzed Max. Wind: 102 kts 36 nm NE of center

PREDICTING TROPICAL CYCLONE DESTRUCTIVE POTENTIAL BY INTEGRATED KINETIC ENERGY ACCORDING TO THE POWELL/REINHOLD SCALE

BACKGROUND OF THE INVENTION

1. Field of the Invention

A method of predicting the ultimate impact of a tropical cyclone (hurricane or typhoon) independent of local factors irrelevant to the storm itself, such as coastline shape, bathymetry, tidal cycle, flood control system, and exposure, robustness of the building code and workmanship; is based on new Wind Destructive Potential (WDP) and Storm Surge Destructive Potential (SDP) scales (the "Powell/Reinhold Scales") which objectively rate the severity and potential impact of a tropical cyclone independent of the local factors.

2. Description of the Related Art

The Hurricane Katrina disaster and recent studies examining hurricanes and global climate change have generated discussion on tropical cyclone intensity and its relevance to destructive potential.

Climate scientists are trying to determine whether hurricanes are becoming more frequent or destructive (Webster et al., "Changes in tropical cyclone number, duration and intensity in a warming environment," *Science*, Vol. 309, 1844-1846, 2005 and Emanuel, "Increasing destructiveness of tropical cyclones over the past 30 years", *Nature*, Vol. 436, 686-688, 2004; each incorporated herein by reference), with resulting impacts on increasingly vulnerable coastal populations. People who lived in areas affected by, Hurricane Katrina are wondering how a storm weaker than Hurricane Camille at landfall, could have contributed to so much more destruction. While intensity provides a measure to compare the maximum sustained surface winds (Vms) of different storms, it is a poor measure of the destructive potential of a storm since it does not account for storm size. The Saffir-Simpson (SS) scale is currently used to communicate the disaster potential of hurricanes in the Western Hemisphere. While it serves a useful purpose for communicating risk to individuals and communities, it is a poor measure of destructive potential of a hurricane because it depends only on intensity. Kantha initiated debate on retiring the Saffir-Simpson scale; See Kantha, "Time to replace the Saffir-Simpson Hurricane Scale?" *Eos, Trans. Amer. Geophys. Union*, Vol. 87, 3-6 (2006), incorporated herein by reference.

Destruction can be qualified in terms of mortality and economic loss, but these measures cannot easily be associated with hurricanes of a given size and intensity because they also depend on population density and coastal vulnerability in the affected areas. Mortality is complicated by direct and indirect causes (Combs et al., "Deaths Related to Hurricane Andrew in Florida and Louisiana", *Int. J. Epidemiol.*, Vol. 25, 537-544, 1992 and Shultz et al. "Epidemiology of tropical cyclones: The dynamics of disaster, disease, and development", *Epidemiol. Rev., Vol.* 27, 21-35, 2005; each incorporated herein by reference), while total insured or estimated economic loss additionally depends on the wealth of the affected areas. Therefore, mortality and insured losses do not necessarily scale within hurricane intensity. For example, the south Florida landfall of Hurricane Andrew (1992) contributed to insured losses of $22 billion (in 2006 dollars) with forty (40) deaths in Miami-Dade County while SS 3 scale Hurricane Katrina (2005) is associated with insured losses of over $42 billion and over 1,400 deaths in Louisiana and Mississippi.

Tropical cyclone intensity in the Atlantic Basin is currently defined by the National Weather Service ((NWS) 2006: Tropical Cyclone Definitions National Weather Service Manual 10-604) as the maximum sustained wind, "the highest one-minute average wind, $V_{MS}$, (at an elevation of 10 m with an unobstructed exposure) associated with that weather system at a particular point in time," and a 1-5 damage potential rating is assigned by the Saffir-Simpson scale (Simpson, The hurricane disaster potential scale, *Weatherwise*, Vol. 27, 169-186, 1974; Saffir, Low cost construction resistant to earthquakes and hurricanes ST/EJA/23, United Nations 216 pp., 1975; more information available from the world wide web at nhc.noaa.gov/aboutsshs.shtml, each incorporated herein by reference). From a practical standpoint, we interpret the $V_{MS}$ as a marine exposure wind. Determination of tropical cyclone intensity often depends on indirect estimates from visible satellite imagery (Dvorak: Tropical cyclone intensity analysis and forecasting from satellite imagery, *Mon. Wea. Rev.*, Vol. 103, 420-430, 1975), pressure-wind relationships (e.g., Kraft: The hurricane's central pressure and highest wind, *Mar. Wea. Log.*, Vol. 5, 157, 1961), or empirical reduction of flight-level reconnaissance wind measurements to produce surface level estimates (Franklin et al.: GPS dropwindsonde wind profiles in hurricanes and their operational implications, *Wea. Forecasting*, Vol. 18, 3244, 2003), each incorporated herein by reference. Coastal communities are warned for tropical cyclone impacts based on intensity information with uncertainties of 10%-20% [depending on the method and measurement platform (Franklin, supra; Uhlhorn and Black: Verification of remotely sensed sea surface winds in hurricanes, *J. Atmos. Oceanic Technology*, Vol. 20, 99-116, 2003), each incorporated herein by reference], and forecasts (24 h) with about 5 m/s mean absolute intensity errors (world wide web at nhc.noaa.gov/verification/Tndes.shtml?), or about one-half an SS category.

Alternative measures to assess hurricane destructive potential include accumulated cyclone energy (ASCE: ASCE 7-05 "Minimum design loads for buildings and other structures"; *American Society of Civil Engineers*, 424 pps., 2005 and Bell et al.: Climate assessment for 1999, *Bull. Amer. Meter. Soc.*, Vol. 81, pages 1328-1378, 2000, each incorporated by reference), hurricane outer- and inner-core strengths (Weatherford and Gray: Typhoon structure as revealed by aircraft reconnaissance, part 1: Data analysis and climatology, *Mon. Wea. Rev.*, Vol. 116, pages 1032-1043, 1988); Croxford and Barnes: Inner core strength of Atlantic tropical cyclones, *Mon. Wee. Rev.*, Vol. 130, pages 127-139, 2002, Roof cladding fatigue index (Mahendran: Cyclone intensity categories. *Wea. Forecasting*, Vol. 13, pages 878-883, 1998), Turbulence kinetic energy dissipation (Businger and Businger: Viscous dissipation of turbulence kinetic energy in storms. *J. Atmos. Sco.*, Vol. 58, pages 3793-3796, 2001), Power (Emanuel, supra), and Hurricane intensity and hazard indices, Kantha, supra). Most of these measures have limitations related to the lack of information on the spacial extent of damaging winds. For example, ACE and power are computed from the square or cube of $V_{MS}$ without considering storm structure.

Mahendran, supra, was the first to call attention to the need for a damage index based on quantities other than $V_{MS}$. He modeled fatigue damage to metal roofing panels and found that the damage depended on the radius of maximum wind, storm translation speed, central pressure, and maximum wind gusts.

Kantha, supra, was the first post-Katrina paper to question the SS scale. He acknowledged the importance of dynamic pressure associated with the wind and proposed a continuous hurricane intensity index (HII) based on the square of the ratio of $V_{MS}$ to a reference wind of 33 m/s. A 6.0 HII rating would represent a maximum sustained surface wind speed of 81 m/s. Kantha also recognized the need to account for storm size and proposed a hurricane hazard index (HHI), which brought in the radius of hurricane-force winds, the storm motion, and the cube of $V_{MS}$ [based on Emanuel's, supra, 2005 claim that damage scales with the third power of $V_{MS}$].

The HHI has the advantage of being a continuous scale, but it is not bounded. The HHI also fails to consider that the wind field of a hurricane can be asymmetric with different wind radii in each quadrant, and become exceeding large when a storm stalls. Dependence on the cube of $V_{MS}$ also makes the HHI overly sensitive to a single wind speed value and a very small part of the storm, which is difficult to sample and measure. Additionally, the damage process is too complex to simply state that it depends on some power of $V_{MS}$. While wind loading on a structure is related to the square of the wind speed (ASCE 7-05, supral, interactions of a structure with the wind are dependent on the structure of the turbulence, the cycling between gusts and lulls and the debris loading. A given building component may have a wind resistance or a wind vulnerability curve that depends on the strength of the local building code, code enforcement and workmanship, and that varies greatly from other components. The ultimate wind resistance of the structure system depends on the interaction of the various components. Economic loss estimates can include indirect affects beyond the physical interactions between structures and wind, such as loss of use, living expenses, food spoilage, etc., resulting in loss relationships to as high as the $9^{th}$ power of the $V_{MS}$ (Nordhaus: The economics of hurricanes in the United States, NBER Working paper w12813 (available on the world wide web online at papers.nber.org/papers/w12813, 2006)). However, attempts to match economic loss to some power of $V_{MS}$ (e.g., Howard et al: The decision to seed hurricanes, *Science*, Vol. 176, pages 1191-1202, 1972) and Nordhaus, supra, fall prey to the same limitations as the SS scale in that they ignore the fact that loss also depends on the wealth and population density of the impacted area such that a large, but relative weak storm in a well populated area (e.g., Francis, 2004: SS 2 scale, 4.4 billion dollars) can result in higher losses (based on estimates from the American Insurance Services Group) than a smaller more intense storm hitting a less populated area (e.g., Dennis, 2005, SS 3 scale, 1.1 billion dollars).

The dynamics of risk perception are also affected insofar as people who decide to leave or stay in response to a hurricane warning make decisions based on perceived vulnerability and past hurricane experience as one of several influences on this perception (e.g., Wilkinson, et al.: Citizens' response to warnings of Hurricane Camille, Social Science Research Center Rep. 35, Mississippi State University, 56 pp., 1970). Those who have experienced significant loss from disasters are more likely to have realistic risk perceptions in response to future warnings (Shultz et al., supra, Milletti and O'Brien: Warnings during disaster: Normalizing communicated risks, *Social Problems*, Vol. 39, pages 40-57, 1992). In the case of Hurricane Katrina (2005) on the Mississippi coast, regardless of warnings well in advance, some people did not evacuate because their location was known to not have been flooded by Hurricane Camille, an SS 5 scale storm that devastated the area in 1969. However, despite having the same SS 5 rating the day before landfall, and a lower (SS 3) rating at landfall, Katrina's landfall wind field was much larger than Camille's (See, FIG. 1a for Hurricane Camille and FIG. 1b for Hurricane Katrina). Without storm size information and the SS classification, some people may have perceived the risk of Katrina to be the same or even lower than Camille. In Katrina's aftermath, many people in coastal Mississippi have repeated the statement attributed to Mr. Tim Hoft of Biloxi on 30 Aug. 2006: "It looks like Hurricane Camille killed more people yesterday than it did in 1969" (A. Lee, Biloxi Sun Herald, 2006). Better risk perception is an important goal for any new metric of hurricane destructive potential.

Applicants suggest that a metric relevant to the physical forces that contribute to damage, based on the size of the wind field and magnitude of the winds, will provide a better tool and method for determining destructive potential.

Applicants have taken a first step toward defining scales to help distinguish between potential wind and wave/surge impacts while retaining the concise range of the SS scale. The destructive potential is suggested as an objective starting point to estimate the impact of the wind field, before the coastal vulnerability, infrastructure, and affected populations are taken into account.

SUMMARY OF THE INVENTION

In comparison to the Saffir-Simpson (SS) scale which originally was defined according to peak 3-second wind gusts (Saffir, supra; later interpreted to be associated with $V_{MS}$, Simpson, supra), Applicants, therefore, provide the alternative Powell/Reinhold scales to the SS scale, which alternative scale is based on integrated kinetic energy as an indicator of destructive potential.

Kinetic energy is relevant to wind destructive potential because it scales with the wind pressure (wind load) acting on a structure (ASCE, "Minimum design loads for buildings and other structures", *American Society of Civil Engineers, ASCE* 7-05, 424 pp., 2005, herein incorporated by reference). However, as much of the built environment consists of structures characterized by brittle failures of components and systems that lead to rapid escalation in damage and losses once a part of the structure or building envelope fails, the integrated kinetic energy is segregated into low, moderate, and high wind speed ranges, and multiplied by representative damage factors.

Storm surge and waves generated by the shear stress of the wind on the ocean also scale with kinetic energy.

The $W_{DP}$ and $S_{DP}$ scales may be computed from actual wind field observations, model forecast fields, or publicly available forecast and warning products issued by operational tropical cyclone forecast centers, such as the National Hurricane Center in the United States.

The scales are relatively insensitive to errors in qualities that are difficult to observe (such as the maximum wind speed in the storm) and may be used for operational and commercial forecasts and warnings (to assist in storm preparation activities and as a metric for evaluating forecasts), for emergency management and response (pre-landfall damage assessments), for evaluation of extreme winds, storm surge, and wave climatology for risk assessment, and as an index for financial products associated with risk management.

DETAILED DESCRIPTION OF THE PREFERRED EMBODIMENTS

Figure 1:
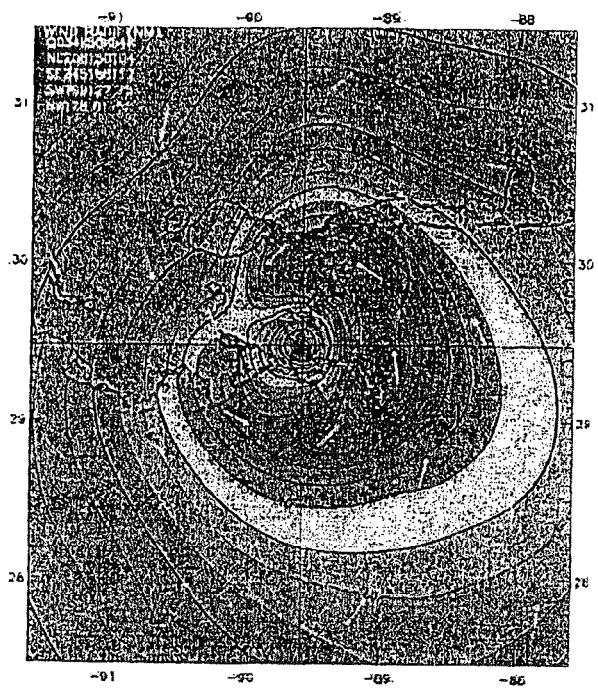
FIG. 1a is a graphic H*Wind isotach analysis (in knots) of Hurricane Camille at landfall based on model and blended observations.
FIG. 1b is a graphic representation of Hurricane Katrina's surface and field peak at peak H*Wind $V_{ms}$.
FIG. 1c is a graphic representation of Hurricane Katrina at landfall.

As an indicator of destructive potential to be used in predicting hurricane destructive potential, potential mortality, and to provide a better risk perception to people affected by hurricanes we propose integrated kinetic energy (IKE), which is computed from the surface wind field by integrating the 10-m-level kinetic energy per unit volume over portions of the storm domain volume (M) containing sustained surface wind speeds (U) within specific ranges, assuming an air density (ρ) of 1 kg m$^{-3}$, satisfying the relationship (1):

$$IKE = \int_v \frac{1}{2}\rho U^2 dV. \quad (1)$$

Here the wind speeds and volume elements (dV) are taken from an objectively analyzed, gridded wind field over a storm-centered 8° latitude domain having grid cells of approximately 6 km on a side and 1 m in the vertical (centered at the 10-m level), and we ignore the contribution of turbulent wind fluctuations to the total kinetic energy of the flow.

Relevance to Wind Destructive Potential

Kinetic energy is relevant to the wind destructive potential because it scales with the wind pressure (wind load) acting on a structure (See, ASCE 7-05, supra). However, much of the built environment consists of structures characterized by brittle failures of components and system that lead to rapid escalation in damage and loss once a part of the structure or building envelope fails. To account for this process, IKE is segregated into low, moderate, and high wind speed ranges, and multiplied by a representative damage factor.

Relevance to Storm Surge and Wave Destructive Potential

Storm surge and waves generated by the shear stress of the wind on the ocean surface also scale with kinetic energy. While the initial dependence of sea surface drag coefficient is linear with wind speed, supporting a cubic dependence for stress, recent investigations (Powell et al.: Reduced drag coefficient for high wind speeds in tropical cyclones, Nature, Vol. 422, pages 279-283, 2003 and Donelan et al.: On the limiting aerodynamic roughness of the sea in very strong winds, *Geophys. Res. Lett.*, Vol. 31, L18306, doi:10.1029/2004GL019460, 2004) suggest that the drag coefficient levels off or even decreases at winds above 33 m/s, suggesting a continued dependence on the square of the wind speed. Cline (Relations of the changes in storm tides on the coast of the Gulf of Mexico to the center and movement of hurricanes, *Mon. Wea. Rev.*, Vol. 48, pages 127-146, 1920) noted several cases of elevated water levels associated with waves propagating from distant tropical cyclones entering the Gulf of Mexico. These waves generate a shoreward flux of momentum known as radiation stress (Longuet-Higgins et al.: Radiation stress in water waves, a physical discussion with application, Deep-Sea Res., Vol. 11, pages 529-563, 1964), which contributes to wave setup and elevated water levels long before landfall, and that can add significantly to the ultimate high water levels during landfall. A study of Hurricane Georges (1998) by Weaver: Effect of wave forces on storm surge, M.S. thesis, Dept. of Civil and Coastal Engineering, University of Florida, 75 pp., 2004, estimated that wave forcing contributed 25%-33% of the total rise in water levels, and the recent post-Katrina study (Interagency Performance Evaluation Task Force (IPET): Performance evaluation of the New Orleans and southeast Louisiana hurricane protection system, Vol. IV, The Storm. Draft Final Report, U.S. Army Corps of Engineers, Vicksburg MS (located on the world wide web at ipet.wes.army.mil/, 2006) indicated wave setup contributing to about 1.4-m water level increases at levees in the vicinity of New Orleans. Indeed, recent hurricanes such as Opal, Georges, Isabel, Ivan, Katrina, Rita, and Wilma indicate that wave and storm surge heights are correlated with the size and intensity of the storm in the hours and days before landfall as well as the actual wind field characteristics during landfall. Consequently, the history of IKE values in the hours and days before landfall are likely to provide a robust estimate of wave and surge destruction potential. However, the ultimate surge actually experienced depends on additional factors such as bathymetric topography, bottom and surface roughness, storm motion, and coastline shape, while the surge- and wave-related destruction depends on the infrastructure at risk.

H*Wind Objective Wind Field Analysis

Measurement of IKE in a hurricane requires sufficient observations for an analysis of the wind field. Air-, space-, land-, and sea-based measurement systems now provide sufficient observations to depict the horizontal distribution of tropical cyclone winds in the western Atlantic and Caribbean basin. The National Oceanic and Atmospheric Administration (NOM)-Atlantic Oceanographic and Meteorological Laboratory (AOML) Hurricane Wind Analysis System (H*Wind; Powell et al: Hurricane Andrew's landfall in south Florida. Part I: Standardizing measurements for documentation of surface wind fields, *Wea. Forecasting*, Vol. 11, pages 304-328, 1996 and Powell et al.: The HRD real-time hurricane wind analysis system, *J. Wind Eng. Ind. Aerodyn.*, Vols. 77-78, page 53-64, 1998) provides an objective analysis of all available quality-controlled observations, and since 1999 these have been available in a gridded format to facilitate research and experimental use in storm surge and wave models, as well as for validation of remotely sensed winds and numerical weather prediction models. Analyses are conducted on an experimental basis when a tropical cyclone is monitored by reconnaissance aircraft. Uncertainty of the analysis-based $V_{MS}$ depends on data coverage and the quality of the individual platforms contributed to the wind measurement, but is estimated at 10% when the peak wind is sampled at the surface, or about 20% if winds are estimated from a simple flight-level wind speed reduction factor. Outside the eyewall where radial gradients are weaker, more plentiful in situ observations are available and wind uncertainty is probably closer to 10%. Landfalling hurricanes contain large sections of the wind field influenced by land friction. To allow for comparison of destructive potential near landfall to earlier offshore stages of the storm, all winds over land are converted to marine exposure using methods described in Powell et al.: Hurricane Andrew's landfall in south Florida, supra, 1996.

Storm Surge and Wave Destructive Potential in Hurricane Katrina Compared to as Camille As an IKE example for storm surge destructive potential, consider a reconstruction of Hurricane Camille's landfall wind field (FIG. 1a) as compared with two analyses of Hurricane Katrina's wind field at different times (FIG. 1b and 1c). The IKE for marine winds>tropical storm force (18 m/s, $IKE_{TS}$) is used as a proxy for storm surge and wave destructive potential. Blending the Shapiro: The asymmetric boundary layer flow under a translating hurricane, J. Atmos. Sci., Vol. 40, page 1984-1998, 1983, wind model (using 909-mb central pressure, 14-km radius of max wind, and a pressure profile parameter of 0.435) with the few available marine observations leads to an estimated $IKE_{TS}$ of 63 TJ contributed by Camille's marine winds >18 m/s (all winds have been converted to a marine exposure). Applicants have compared this to two stages of Hurricane Katrina's wind field as depicted in post-storm analysis of all available observations during two approximately 6 hour periods on 28 and 29 Aug. 2005. A day before landfall, when an SS5 scale (shown in FIG. 1b), Katrina's marine wind field contained $V_{MS}$ estimated at 71 m/s with an $IKE_{TS}$ of 124 TJ. At landfall in southern Louisiana and Mississippi, Katrina had weakened to SS3 status (52 m/s), but the marine-equivalent wind field in the storm core expanded (See, FIG. 1c) resulting in a respective $IKE_{TS}$ of 122 TJ. Therefore, based on $IKE_{TS}$, Katrina at landfall had destructive potential for storm surge similar to that attained a day earlier when it had a stronger $V_{MS}$. Both analyses suggest Katrina had much more destructive potential than Camille. The tremendous wave- and storm surge-related destruction of Katrina at landfall was not well represented by the SS rating; SS3 Katrina at landfall (122 TJ) was more destructive than SS5 Camille (63 TJ) and similar to SS5 Katrina (124 TJ). This is especially pertinent when considering designs for flood protection systems; the maximum surge in a small SS5 hurricane could be lower and act over a much smaller portion of the coast than the surge generated by a large SS3 hurricane.

Sensitivity of IKE Calculations to Wind Bias

While landfall estimates of $V_{MS}$ in a hurricane can vary by scientist, engineer, or agency, the experiments suggest that IKE is not sensitive to bias in the $V_{MS}$ estimate. To simulate a case in which a bias might be present for example a high bias in the reduction factor used to estimate $V_{MS}$ from reconnaissance flight-level winds, a 20% bias was added to the Andrew grid point containing $V_{MS}$, resulting in a 0.18% increase in $IKE_{TS}$ and a 0.49% increase in IKE contributed by winds above hurricane force ($IKE_H$). To simulate a biased reduction factor affecting all observations in the inner core, a 100% bias was added to all grid points containing surface winds above hurricane force, resulting in a 7.6% increase in $IKE_{TS}$ and a 21% increase in $IKE_H$. In practice, any bias evident in a reduction method is minimized by the H*Wind analyst choosing the reduction method that best agrees with available surface observations (typically GPS sondes are available for comparison). When the Stepped-Frequency Microwave Radiometer (SFMR) instrument transition to the Air Force Reserves Hurricane Hunter fleet is completed, the use of reduction factors should cease except for retrospective analysis of historical storms. It is possible that the observations used for an H*Wind analysis might not sample the maximum wind region due to radial reconnaissance flight legs typically covering four azimuths over the 4-6-hour period required for a H*Wind analysis. However, this should not result in a systematic error and the magnitude of the error would be on the order of one half the storm translation speed. If a major, nontransient convective burst was not sampled by the aircraft, the error could be larger, but subsequent samplings would provide updated calculations.

Wind and Storm Surge/Wave Impacts

A variety of IKE calculations options were explored by summing IKE contributions over several wind speed thresholds for a selection of gridded wind fields from 23 hurricanes comprising large and small wind fields available from the H*Wind archive (ww.aoml.noaa.gov/hrd/data_sub/wind.html) over an 8° latitude domain (See, Table 1 below). A wind speed of 10 m/s was selected for the low end ($IKE_{>10}$), with additional thresholds for tropical storm force (>18 m/s, $IKE_{TS}$) and hurricane force (>33 m/s, $IKE_H$) chosen to relate to storm surge and wave destructive potential. Wind destructive potential thresholds include light (25 to <41 m/s$^{-3}$, $IKE_{25-40}$), moderate (41 to 55 m/s, $IKE_{41-54}$), and severe (≧55 m/s, $IKE_{55}$).

TABLE 1

H*Wind analysis cases associated wind field structure quantities, IKE calculations (TJ), $W_{DP}$, $S_{DP}$, SS, and HII. H*Wind $V_{MS}$ represents the maximum wind speed in the gridded file, which is usually smaller than the maximum wind speed depicted in the H*Wind graphic $P_{min}$ is from best track SS and HII are based on best track $Y_{MS}$ (not shown)

| Storm | Year | Month-day | Time (UTC) | $R_{max}$ (km) | $P_{min}$ (hPa) | $Y_m$ (ms$^{-1}$) | $R_{18}$ (km) | $R_{26}$ (km) | $R_{33}$ (km) |
|---|---|---|---|---|---|---|---|---|---|
| Andrew | 1992 | 8-24 | 0900 | 19 | 922 | 68 | 191 | 142 | 77 |
| Camille | 1969 | 8-18 | 0430 | 15 | 909 | 65 | 230 | 163 | 109 |
| Charley | 2004 | 8-13 | 1930 | 7 | 941 | 63 | 156 | 81 | 40 |
| Dennis | 2005 | 7-10 | 1930 | 9 | 946 | 51 | 296 | 77 | 33 |
| Emily | 2005 | 7-20 | 0130 | 24 | 948 | 54 | 291 | 168 | 86 |
| Fabian | 2003 | 9-05 | 1330 | 67 | 941 | 51 | 380 | 241 | 138 |
| Frances | 2004 | 9-05 | 0130 | 52 | 960 | 46 | 319 | 217 | 139 |
| Hugo | 1989 | 9-22 | 0400 | 37 | 934 | 58 | 317 | 235 | 146 |

TABLE 1-continued

H*Wind analysis cases associated wind field structure quantities, IKE calculations (TJ), $W_{DP}$, $S_{DP}$, SS, and HII. H*Wind $V_{MS}$ represents the maximum wind speed in the gridded file, which is usually smaller than the maximum wind speed depicted in the H*Wind graphic $P_{min}$ is from best track SS and HII are based on best track $Y_{MS}$ (not shown)

| | | | | | | | | | |
|---|---|---|---|---|---|---|---|---|---|
| Iris | 2001 | 10-09 | 0130 | 8 | 948 | 43 | 165 | 93 | 37 |
| Isabel | 2003 | 9-18 | 1630 | 87 | 957 | 47 | 532 | 322 | 214 |
| Ivan (AL) | 2004 | 9-16 | 0730 | 35 | 946 | 49 | 326 | 206 | 128 |
| Ivan (Jamaica) | 2004 | 9-11 | 1330 | 17 | 925 | 70 | 314 | 196 | 121 |
| Jeanne | 2004 | 9-26 | 0330 | 48 | 950 | 46 | 317 | 201 | 131 |
| Katrina (FL) | 2005 | 8-25 | 2230 | 15 | 984 | 33 | 115 | 44 | 28 |
| Katrina (LA) | 2005 | 8-29 | 1200 | 65 | 920 | 52 | 454 | 311 | 217 |
| Katrina peak H*Wind | 2005 | 8-28 | 1200 | 26 | 909 | 71 | 349 | 218 | 139 |
| Keith (Belize) | 2000 | 10-01 | 2230 | 19 | 959 | 50 | 154 | 62 | 44 |
| Michelle | 2001 | 11-04 | 1930 | 28 | 949 | 50 | 335 | 120 | 80 |
| Opal | 1995 | 10-04 | 2235 | 98 | 942 | 50 | 353 | 191 | 169 |
| Rita | 2005 | 9-24 | 0730 | 30 | 937 | 49 | 357 | 230 | 174 |
| Wilma peak H*Wind | 2005 | 10-19 | 1930 | 7 | 892 | 62 | 326 | 97 | 53 |
| Wilma (FL) | 2005 | 10-24 | 1030 | 72 | 951 | 51 | 380 | 268 | 179 |
| Wilma (Mexico) | 2005 | 10-22 | 0130 | 20 | 930 | 59 | 394 | 220 | 121 |

| Storm | $W_{DP}$ | $S_{DP}$ | $IKE_{10}$ | $IKE_{TS}$ | $IKE_H$ | $IKE_{25-40}$ | $IKE_{41-54}$ | $IKE_{55}$ | SS | HII |
|---|---|---|---|---|---|---|---|---|---|---|
| Andrew | 5.0 | 2.5 | 40 | 20 | 7 | 7 | 3 | 2 | 5 | 5.2 |
| Camille | 5.2 | 4.0 | 78 | 63 | 31 | 32 | 14 | 3 | 5 | 5.0 |
| Charley | 4.1 | 1.9 | 24 | 11 | 2 | 5 | 1 | 0 | 4 | 4.1 |
| Dennis | 0.3 | 3.4 | 77 | 40 | 2 | 7 | 1 | 0 | 3 | 2.7 |
| Emily | 1.7 | 4.2 | 105 | 70 | 14 | 38 | 4 | 0 | 3 | 3.0 |
| Fabian | 3.7 | 5.1 | 165 | 123 | 40 | 6 | 21 | 0 | 3 | 3.0 |
| Frances | 2.5 | 4.7 | 124 | 94 | 29 | 53 | 8 | 0 | 2 | 2.0 |
| Hugo | 4.7 | 4.7 | 110 | 95 | 25 | 51 | 9 | 1 | 4 | 3.5 |
| Iris | 0.1 | 1.3 | 8 | 5 | 1 | 2 | 0 | 0 | 4 | 3.8 |
| Isabel | 3.4 | 5.6 | 212 | 174 | 42 | 93 | 12 | 0 | 2 | 1.9 |
| Ivan (AL) | 2.2 | 4.4 | 109 | 81 | 26 | 46 | 7 | 0 | 3 | 2.7 |
| Ivan (Jamaica) | 5.6 | 4.7 | 142 | 95 | 32 | 43 | 11 | 6 | 4 | 3.8 |
| Jeanne | 1.9 | 4.3 | 109 | 73 | 21 | 39 | 6 | 0 | 3 | 2.7 |
| Katrina (FL) | 0.1 | 1.3 | 27 | 5 | 0 | 2 | 0 | 0 | 1 | 1.2 |
| Katrina (LA) | 3.7 | 5.1 | 151 | 122 | 49 | 68 | 21 | 0 | 3 | 3.0 |
| Katrina peak H*Wind | 5.8 | 5.1 | 166 | 124 | 45 | 58 | 16 | 7 | 5 | 5.2 |
| Keith (Belize) | 0.5 | 1.9 | 20 | 11 | 4 | 4 | 2 | 0 | 3 | 2.4 |
| Michelle | 1.7 | 4.0 | 109 | 61 | 14 | 17 | 8 | 0 | 4 | 3.5 |
| Opal | 3.5 | 5.0 | 173 | 119 | 38 | 46 | 21 | 0 | 3 | 2.4 |
| Rita | 2.6 | 4.3 | 104 | 74 | 32 | 42 | 12 | 0 | 3 | 2.4 |
| Wilma peak H*Wind | 4.6 | 4.2 | 132 | 70 | 7 | 13 | 4 | 1 | 5 | 4.8 |
| Wilma (FL) | 2.8 | 4.8 | 153 | 104 | 29 | 48 | 12 | 0 | 3 | 2.5 |
| Wilma (Mexico) | 4.7 | 5.1 | 170 | 121 | 28 | 49 | 13 | 1 | 4 | 3.2 |

Figure 2:
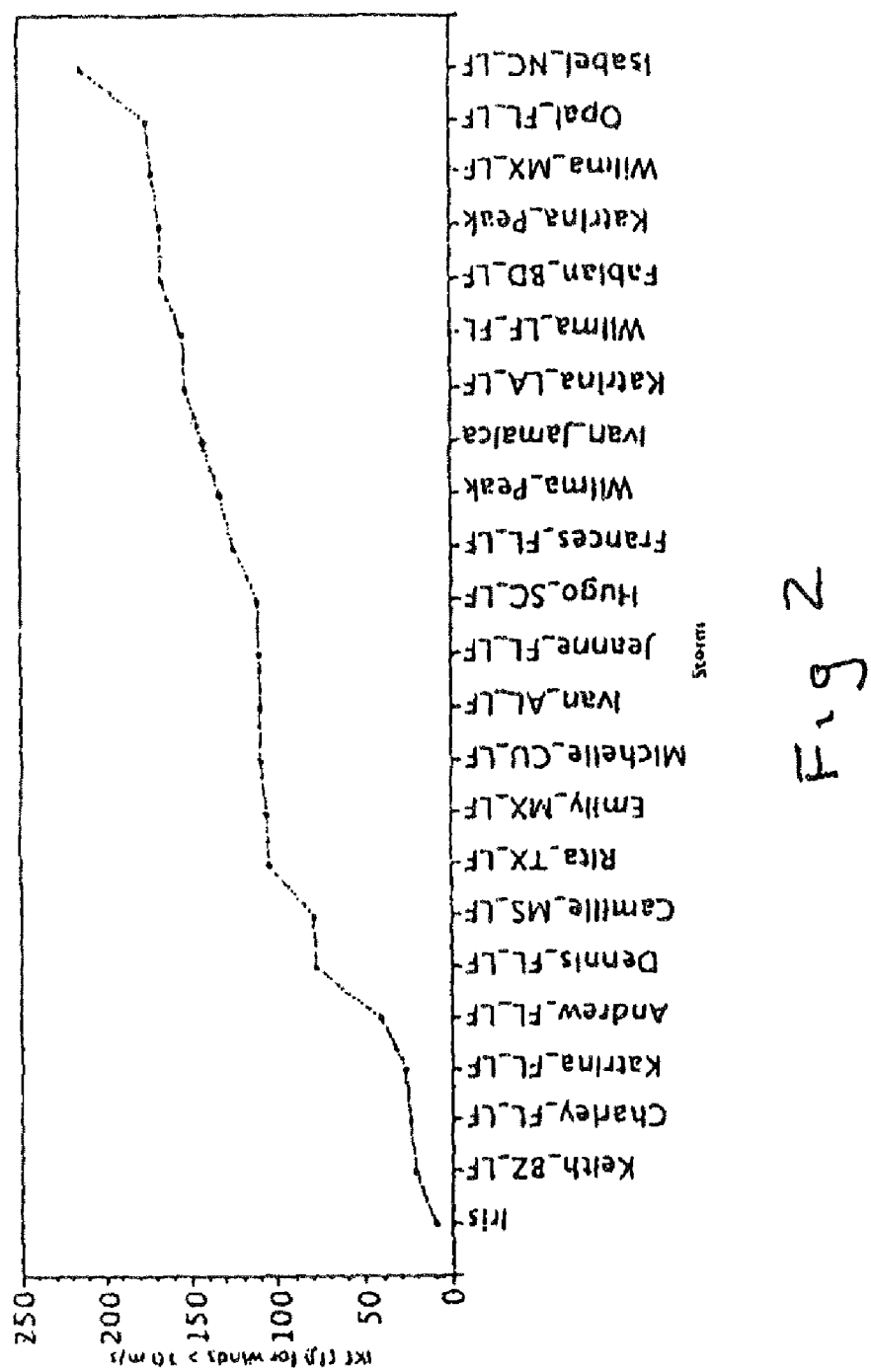
FIG. 2 is a graphic representation of Storm-scale integrated Kinetic energy for winds >10 m/s.

Applicants examined the storm-scale energy in the wind field using $IKE_{>10}$ (See, FIG. 2). While the range in values shown in FIG. 2 gives some idea of the energy differences between large (Hurricane Isabel (2003)) and small storms (Hurricanes Andrew (1992), Charlie (2004), Camille (1969)), it is not well suited as a general indicator of damage potential since it fails to convey the potential for either wave or storm surge, or wind damage by small storms like Camille and Andrew.

Wind Destructive Potential

Since the concept of a damage potential rating with a 1-5 range is familiar to the public, Applicants investigated the range of various IKE measures computed from a variety of storms in the H*Wind archive (Table 1). With the exception of Hurricanes Ids, Keith, and Michelle (in which grid points over land reflect open terrain winds), the gridded fields represent marine winds throughout the analysis domain. A rating system for wind destructive potential is assigned according to Table 2.

TABLE 2

A wind and storm surge/wave destructive potential rating for hurricanes based on integrated kinetic energy (TJ).

| Wind destructive potential rating | Wind damage-weighted IKE | Surge/waves destructive potential rating | Storm surge and waves $IKE_{TS}$ |
|---|---|---|---|
| 0.1 | 0.5 | 0.1 | 0.7 |
| 1.0 | 34.5 | 1.0 | 2.7 |
| 2.0 | 78.0 | 2.0 | 11.7 |
| 3.0 | 135.0 | 3.0 | 29.5 |
| 4.0 | 30 $IKE_{55}$ 1.1 | 4.0 | 61.0 |
| 5.0 | 30 $IKE_{55}$ 50 | 5.0 | 119.5 |
| 5.9 | 30 $IKE_{55}$ 298 | 5.9 | 260.0 |

Applicants limited the rating to 6.0 and follow the recommendation of Kantha, supra, for a continuous scale to prevent discrete jumps in category.

Figure 3:
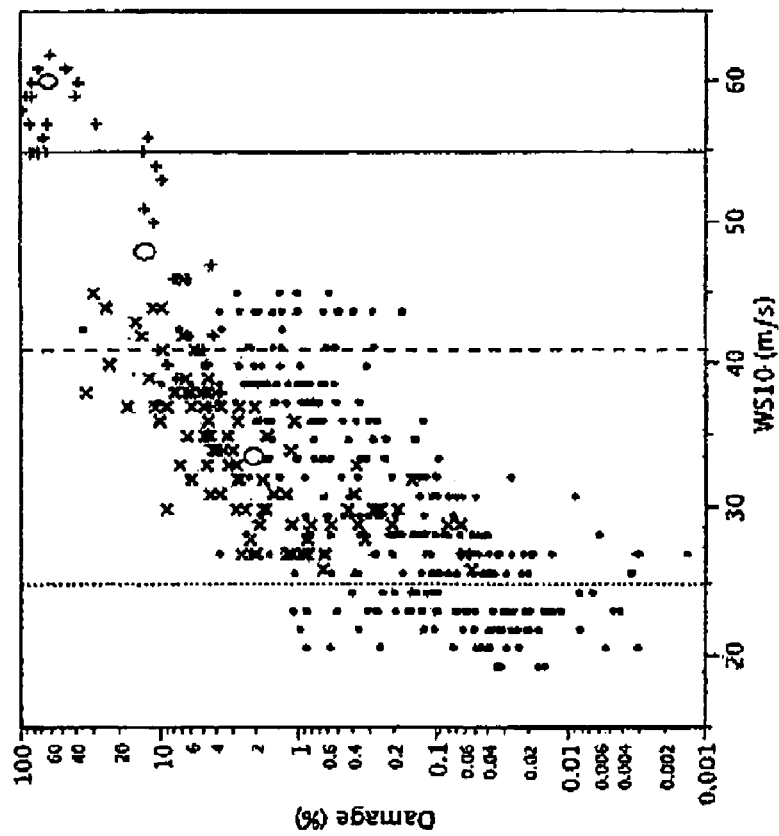
FIG. 3 is a graphic representation of Residential Wind Damage (claim to insured value ratio) as a function of 10-m open-terrain $V_{ms}$ for zip codes in Hurricanes Andrew, Hugo and Opal.

To convey the potential for wind damage, Applicants take into account the nonlinear nature of the interaction of wind with structures. Residential structures respond to wind in a highly nonlinear process, as evidenced by residential insurance losses at zip codes (See, FIG. 3) compared to H*Wind open terrain wind speeds in Hurricanes Andrew, Hugo, and Opal as described in Powell, 2000, supra. Light, moderate, and severe wind damage thresholds correspond to loss levels of about 2%, 12% and 60% of insured value. The respective IKE wind damage thresholds were weighted by multipliers of 1.0, 6.0 and 30.0 to account for the relative contributions to losses (e.g., winds $\geq$55 nm s ($IKE_{55}$) produce about 30 times more loss, and winds from 41 to <55 m/s ($IKE_{41-54}$) produce 6 times more loss than winds 25 to <41 m/s ($IKE_{25-40}$). However, describing impacts of small, intense storms within the context of larger, less intense storms remains a challenge. The weighted IKE values obtained from this analysis did not appear to do justice to the dramatic damage potential associated with a small, intense storm with winds >55 m/s.

Consequently, Applicants segregated storms with winds $\geq$+55 m/s from the population and reserve a scale rating >4 for these storms using a different empirical fit. Very small, intense storms are also a challenge for gridding an analysis. Several of the gridded field $V_{MS}$ values for storms listed in Table 1 show difference from $V_{MS}$ depicted in the H*Wind online graphical product (not shown). The H*Wind analysis is continuous and constrained to match the observed $V_{MS}$; depending on the grid resolution, the maximum gridded $V_{MS}$ will typically be less. As described below, the $V_{MS}$ value has little effect on the IKE calculations, but grid resolution should be adjusted to better resolve grid cells in which $V_{MS}$ is $\geq$+55 m/s. For example, the online H*Wind analysis graphic for Hurricane Iris (not shown) depicts a $V_{MS}$ of 66 m/s, but the largest value in the 1.5-km resolution gridded field was 43 m/s. A smaller grid size would be needed to resolve $V_{MS}$ and compute $IKE_{55}$ for this tiny storm.

Figure 4:
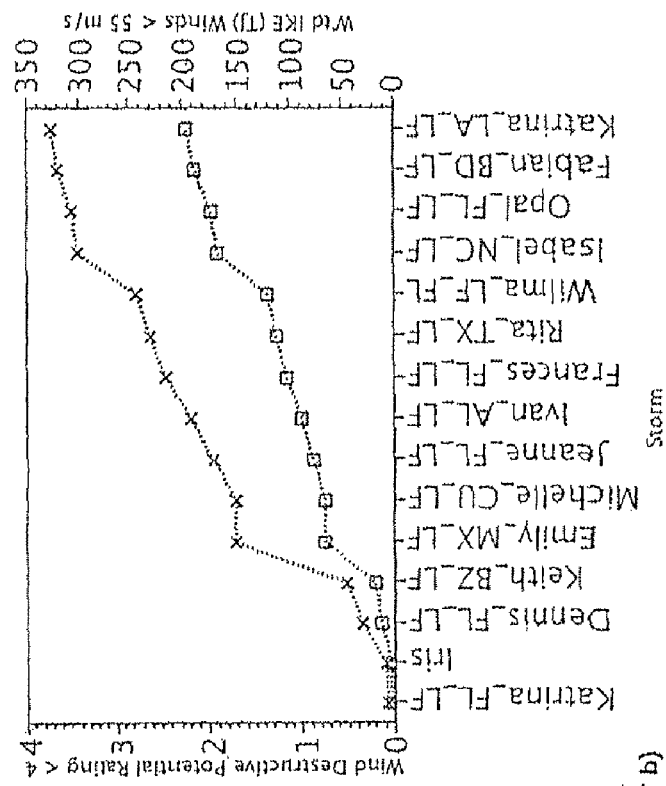
FIG. 4a is a graphic representation of Wind Damage Potential Category assigned to storms for the H*Wind archive to categories 4 and 5 (x's) based on weighted IKE (squares) for winds ≧55 m/s*.
FIG. 4b is a graphic representation similar to that of FIG. 3 but for categories 1-3 (x's) based on weight and IKE (squares) for winds 25-41, and 41-54 m/s.
Figure 4:
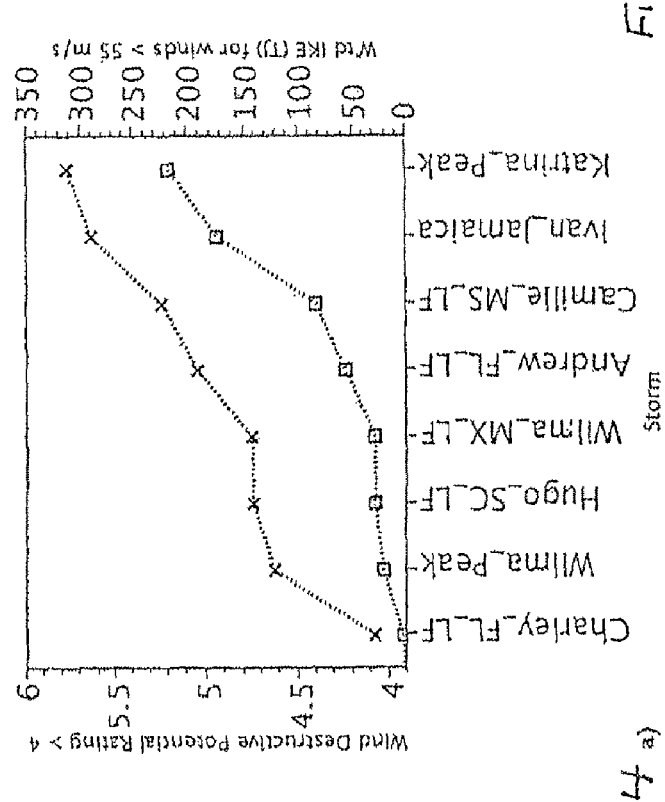

Storms with winds <55 m/s are assigned a wind destructive potential ($W_{DP}$) rating <4 (See, FIG. 4a), based on the sum of the damage-weighted IKE values ($IKE_{25-40}$+6 $IKE_{41-54}$) in (TJ). As indicated in Table 2, a storm need not be a hurricane to be rated for $W_{DP}$, $$W_{DP}<4=0.67+0.017(IKE_{24-40}+6IKE_{41-54})-5.4\times10^{-5}[(IKE_{25-40}+6IKE_{41-54})-109.6]^2; \quad (2)$$

$W_{DP}$ ratings >4 (FIG. 4b) are assigned to storms with winds $\geq$55 m/s, and are based on the contribution of the damage-weighted IKE value, 30 $IKE_{55}$ alone:

$$W_{DP}>4=3.28+1.007\times Log_{10}(30IKE_{55})+0.271\times[Log_{10}(30IKE_{55})-1.629]^2. \quad (3)$$

A $W_{DP}$ rating of 3.5 was assigned to Katrina at landfall in Louisiana and Mississippi with a rated IKE of 195 TJ for winds <55 m/s (FIG. 4a). For storms with winds >55 m/s, a $W_{DP}$ of 5 was assigned to a 30 $IKE_{55}$ value of 50 TJ and the upper limit of 5.99 is reached if 30 $IKE_{55}$ values reach 298 TJ. For example, Hurricanes Camille (Mississippi), Andrew (Florida), Ivan (near Jamaica), and Katrina the day before landfall received $W_{DP}$ ratings >5 but Charley (Florida), Hugo (South Carolina), and Wilma (near the Yucatan of Mexico) rate 4<$W_{DP}$<5 (FIG. 4b).

Storm Surge and Wave Destructive Potential

Figure 5:
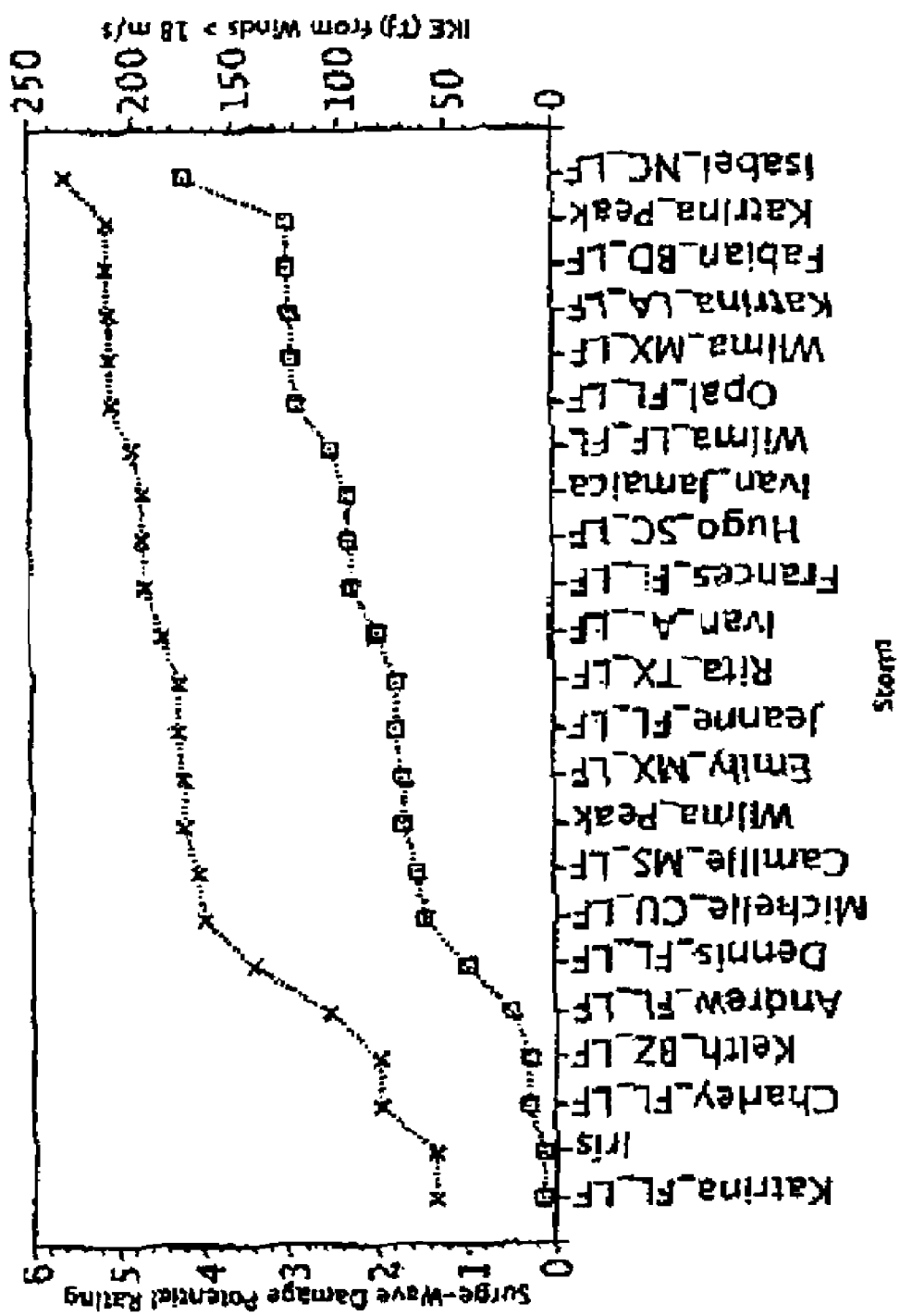
FIG. 5 is a graphic representation as in FIGS. 4a and 4b, but for storm surge and wave damage potential categories (x's) related to IKE for winds >33 m/s (squares)

As an indicator of storm surge and wave destruction potential ($S_{DP}$) Applicants evaluated $IKE_{TS}$ and $IKE_H$. $IKE_{TS}$ (FIG. 5; Table 1) was selected because it covered the possibility of a large, strong tropical storm posing a larger surge and wave threat than a small, weak hurricane. In contrast to $W_{DP}$, Applicants have not applied damage multipliers or weights so the $IKE_{TS}$ energy levels in FIG. 5 are not comparable to FIG. 4, but they do represent a contribution to the $IKE_{10}$ values in FIG. 3.

A continuous $S_{DP}$ rating was assigned according to $$S_{DP}=0.676+0.43\sqrt{IKE_{TS}}--0.9176(\sqrt{IKE_{TS}}-6.5)^2. \quad (4)$$

For storm surge and waves Hurricanes Katrina (Louisiana and at peak H*Wind intensity), Wilma (Mexico), Fabian, Isabel, and Opal all rate $S_{DP}$>5, while Camille, Jeanne, Frances, Rita, Ivan (Alabama and Jamaica), Wilma (peak H*Wind intensity and Florida), Hugo, and Emily all receive 4<$S_{DP}$<5.

Comparison of IKE to SS and HII

Figure 6:
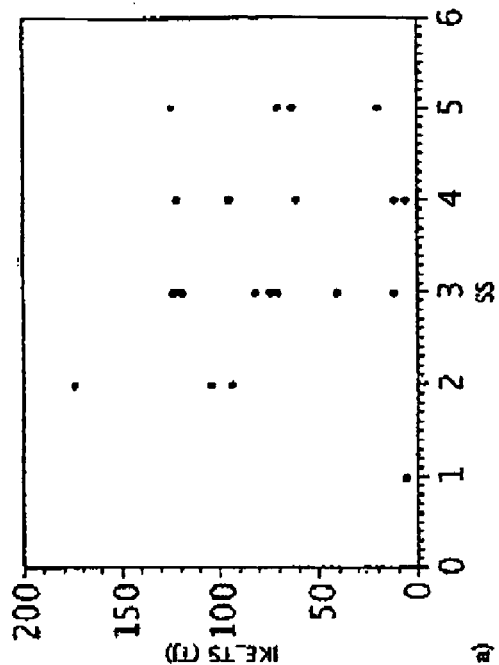
FIG. 6a is a graphic representation of a comparison of $IKE_{TS}$ of a SS scale based on best track $V_{ms}$.
FIG. 6b which is comparison of $IKE_{TS}$ and HII based on best track Van.
Figure 6:
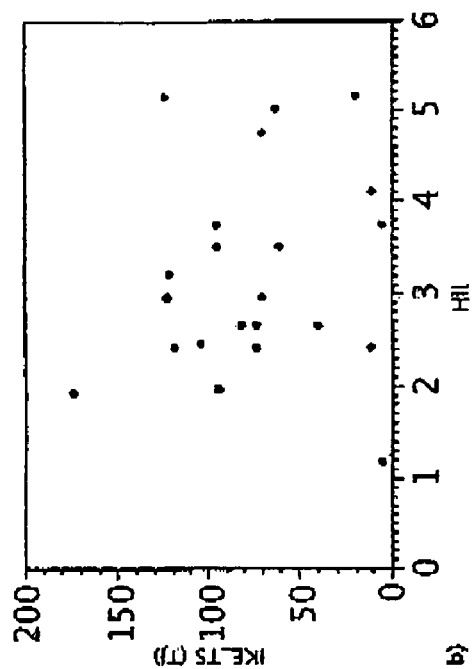
Figure 7:
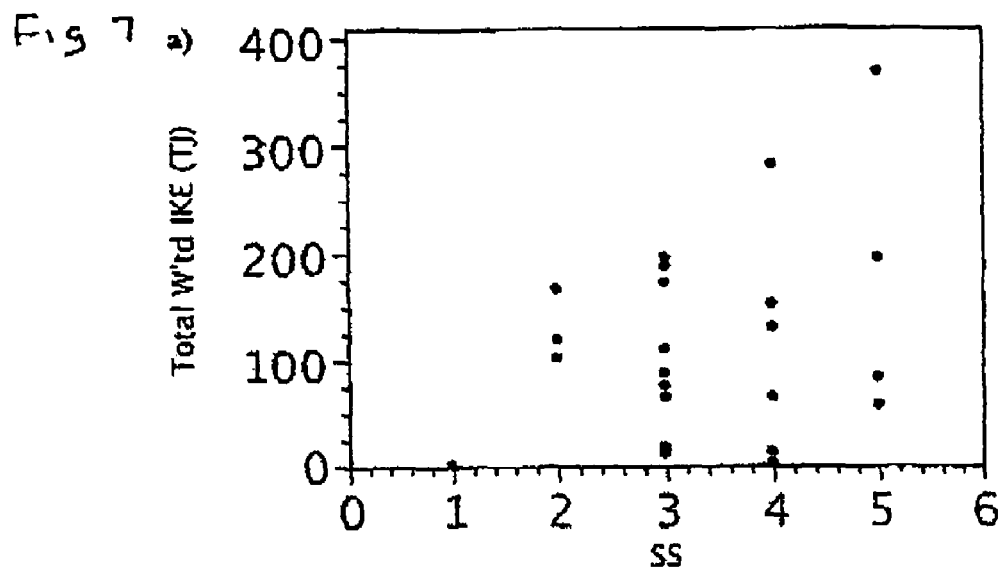
FIG. 7a is a graphic representation of a comparison of SS to total wind damage weighted IKE.
FIG. 7b which is HII compared to total wind damage-weighted IKE.
FIG. 7c $W_{DP}$ plotted against total wind damage-weighted IKE.
Figure 7:
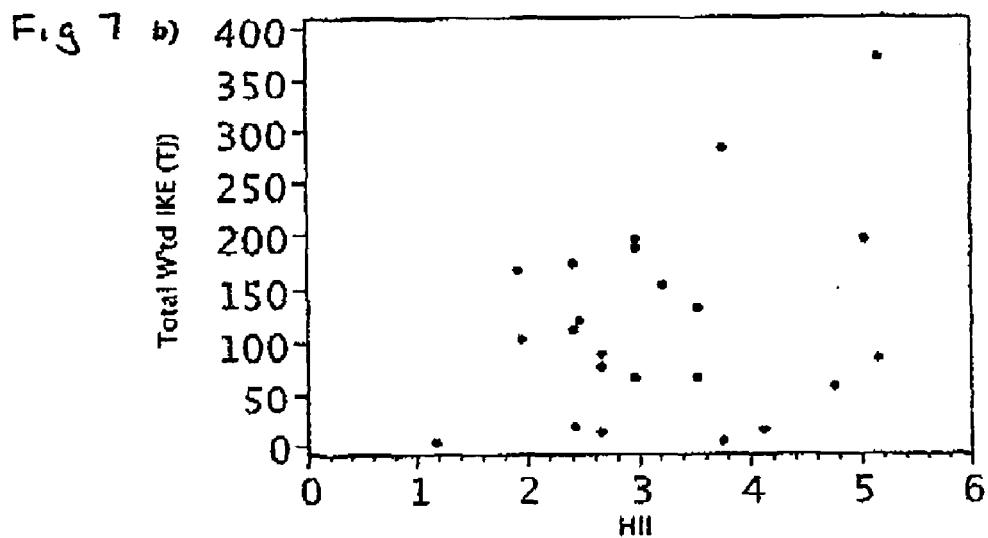
Figure 7:
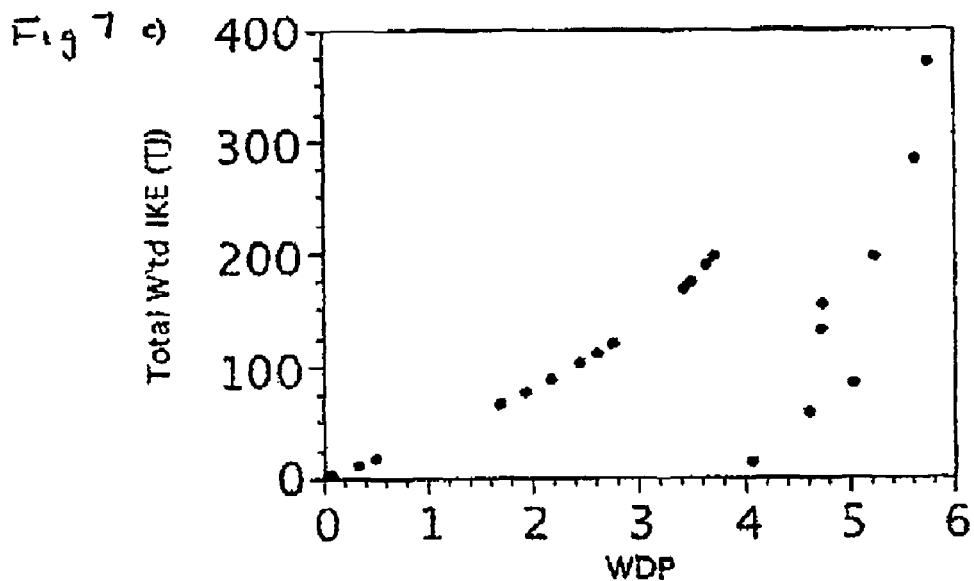

The $IKE_{TS}$ was compared to SS and HII (FIG. 6) computed from the best track $V_{MS}$ closest to the times of the H*Wind analyses contained in the NHC storm report (for cases near landfall) or HURDAT (official NHC historical data on storm position, surface pressure, and intensity at 6h intervals) as found in the world wide website of the national oceanic graphic an aeronautic administration file (pastall shtml). No relationship is evident and the HII yields only five values >4.0. The total wind damage-weighted IKE is computed as the sum ($IKE_{25-40}$+6 $IKE_{41-54}$ +30 $IKE_{55}$) and compared to SS, HHI, and $W_{DP}$ in FIG. 7. The SS (FIG. 7a), and HI (FIG. 7b) show a small dependence ($r^2$ of 10% and 12%, respectively) on wind damage-weighted IKE.

Ideally, an IKE measure of wind damage potential should be continuous. However, despite weighting IKE by damage, a discontinuity is apparent in FIG. 7c, caused by the different empirical fit (3) we chose to account for small storms with strong ($\geq$55 m/s) winds. These storms have smaller values of total wind damage-weighted IKE than larger storms with weaker winds. Using IKE to describe potential impacts of small, intense storms within the context of larger, but less intense storms remains a challenge, and Applicants welcome suggestions for improving the scale and the concepts behind it. Improvement of damage-wind relationship will likely require further research concerning the escalation of damage and loss as winds begin to generate large amounts of airborne debris and buildings begin to disintegrate.

Estimating $W_{DP}$ and $S_{DP}$ Wind Radii

From a practical point, to estimate $W_{DP}$ and $S_{DP}$, surface wind fields should be available to compute IKE. H*Wind fields are limited geographically and are not always available. H*Wind analyses are experimental research products generated when sufficient observations are available for analysis (typically when named tropical cyclones are within reconnaissance aircraft range in the Atlantic basin and also occasionally in the eastern and central Pacific basins if aircraft sortie there). Gridded surface wind fields from numerical weather prediction models such as the Geophysical Fluid Dynamics Laboratory (GFDL) model are available in gridded binary (GRIB) format, so IKE, $W_{DP}$, and $S_{DP}$, could be routinely computed from model forecast fields. Operational estimates of wind radii can be used to estimate IKE, $W_{DP}$, and $S_{DP}$, values in the absence of a gridded wind field. Operational estimates of the $V_{MS}$, and outermost radii of tropical storm ($R_{18}$), 26 m/s (50 kt or $R_{26}$), and hurricane-force ($R_{33}$) winds are issued in operational tropical cyclone advisories and forecasts every 6 h.

To develop relationships between wind radii and IKE, WDP, and SDP, H*Wind radii were recorded from test information provided on each of the graphical analysis products listed in Table 1. Here, $R_{max}$ was determined from the location of the maximum observed wind measurement from each analysis. Least squares regression resulted in a series of relationships as shown below for estimating various IKE quantities, WDP, and SDP from wind radii. These relationships may be used to estimate IKE, WDP, and SDP from operational advisory information. Operational forecasts do not include radius of maximum wind speed ($R_{max}$), but the calculations could use the Rmax information contained in the CARQ (Combined Automated Response to Query) "cards" available from the NHC archive of public aids (A decks) and assume persistence so that forecasts of WDP and SDP could be generated. The relationships listed herein below should be considered preliminary estimates; a larger selection of H*Wind analyses could further refine the expressions and take into account wind field asymmetry. Tropical cyclones in basins outside the Atlantic may have different wind averaging specifications and different wind field radii characteristics, necessitating wind radii relationships tailored to the basin of interest. For basins outside the Atlantic, satellite remote sensing of ocean vector winds are sufficient to determine $IKE_{TS}$ in weak tropical cyclones, but improvements are needed to sample stronger storms and relate wind radii to additional IKE values. Of special interest would be whether improved satellite remote sensing of larger storms in the western Pacific basin can eventually help establish IKE values associated with the upper limits of WDP and SDP.

With wind radii information available in historical tropical cyclone databases, $W_{DP}$ and $S_{DP}$ computations could be made for retrospective analysis of historical storms with sufficient radii data. For studies involving tropical cyclone climate variability and global climate change, accumulated IKE, and $IKE_{55}$ could be computed over the 6-h periods of storms over a season (similar to the current ACE and power calculations). Accumulated IKE should better convey tropical cyclone severity and destructive potential than the ACE or power calculations currently conducted.

Applicants have proposed $W_{DP}$ and $S_{DP}$ ratings based on IKE computations from 23 objectively analyzed hurricane wind fields. The $W_{DP}$ ratings >5 include Hurricanes Katrina (on 28 August), Andrew, Camille, and Ivan (near Jamaica). Storms with $S_{DP}$ ratings >5 include Katrina at landfall in Louisiana, Isabel at landfall in North Carolina, Opal at landfall in Florida, and Wilma at landfall in Mexico. Camille received an $S_{DP}$ rating of 4. The $S_{DP}$ ratings >4 for Hurricanes Frances, Jeanne, Hugo, Ivan, Rita and Wilma suggest that these storms were capable of surge and wave impacts similar to Camille had they followed the same track. The variability in storm size and intensity leads to interesting combinations of destructive potential. For example, Andrew and Charley's Florida landfalls were more wind threats with $W_{DP}$ of 5.0 and 4.1, respectively, than surge threats ($S_{DP}$ of 2.5 and 1.9), while Isabel (North Carolina) and Opal (Florida) were more surge ($S_{DP}$ of 5.6 and 5.0) than wind ($W_{DP}$ of 3.4 and 3.5) threats.

Ultimately, the damage potential rating should be based on an objective measure of damage realized but such depends on the infrastructure, population, and wealth of an affected area; the susceptibility of the area to surge and waves; and the difficulty of attributing damage to wind, wave or surge. An IKE-based approach to destructive potential provides an objective means to compare historical storms and makes no distinction on whether a tropical cyclone is classified as a hurricane or tropical storm (a large, strong tropical storm could have a larger destructive potential than a small, weak hurricane); the rating could also be applied to nontropical storms. IKE values can be routinely computed from gridded surface wind field output from numerical weather prediction models. Comparisons of model and analysis IKE computations would supplement model performance evaluations. With the provided relationships, IKE quantities may be forecast and estimated through a storm's life cycle from wind radii information available from operational advisories, forecasts, and historical databases. IKE values can be summed to provide a cumulative index applicable to global climate change assessments of tropical cyclone destructiveness. IKE values or their associated wind fields can at some point be combined with bathymetric topography, storm motion, and infrastructure at risk to produce more realistic estimates of expected damage and disruption at specific locations.

The IKE-based $W_{DP}$ and $S_{DP}$ calculations are more complex than the current SS, and there may be some resistance to any new metric if there were any chance it might confuse the public. By using the familiar numerical range covered by the SS, Applicants new metrics simply apportion the destructive potential between wind and surge similar to the qualitative graphics of wind versus surge threats effectively presented to the public by The Weather Channel. The $W_{DP}$ and $S_{DP}$ convey destructive potential from a physical basis in terms of wind loading and sea surface stress. By considering the importance of storm size and wind strength, when computed and compared among historical storms that have affected a geographical area, $W_{DP}$ and $S_{DP}$ could help to improve risk perception among the public.

Some limitations of IKE as a metric of destructive potential include the inability to account for 1) a localized areas susceptible to storm surge and waves due to coastline shape and bathymetric topography, 2) storm motion contributions to surge, 3) duration- and wind direction steadiness-related wind damage (Powell, supra, 2000), 4) variations in air density (about 5%) over the area of winds >25 m/s, and 5) the contribution of the turbulence kinetic energy in generating roof suction pressures and debris missiles.

Revisions of the destructive potential scales could incorporate the factors above, the duration of the storm within the basin, and new findings on the interaction of winds with structures and with the ocean surface. The influence of storm motion, bathymetric topography, coastline shape, surface topography, and roughness could be used as modifiers for the IKE quantities, much the same as soil modification factors are used to estimate site-specific ground motions in earthquakes. Tests conducted during the 2007 hurricane season indicated that the $W_{DP}$ calculation using equation 2 or Powell and Reinhold 2007 contains negative quadratic terms that produce too low $W_{DP}$ values from small values of $IKE_{24-40}$ and $IKE_{41-54}$.

Continuous damage multiplier functions were developed from the zip code level loss data described in Powell and Reinhold 2007. For gridded wind fields, the function is applied to determine the multiplier ($M_G$) as a function of the kinetic energy per unit volume ($KE_V$) in the grid cell, $$M_G 3.45 * [1+\text{Tan } H(0.002469*(KE_V-1602.94))]) \quad \text{C1}$$

and all grid cell products of $M_G*KE_V*$Area are summed to compute the storm total damage-weighted kinetic energy ($IKE_{WT}$) over a 1 m thick layer centered at 10 m, where area represents the area of a grid cell in m².

$$IKE_{WT}=\text{SUM}(MG*KE_V*\text{Area}) \text{ for all grid cells containing winds} >25 \text{ m}^2.$$

As a result, the revised $W_{DP}$<4 is:

$$WDP<4=0.8828+0.0183(IKE_{WT})^{0.5}+0.802 \text{ Log}_{10}(IKE_{WT}) \quad \text{C2}$$

The revised $W_{DP}$<4 is:

$$WDP>4 \text{ requires } V_{MS}>55 \text{ m s}^{-1}$$

$$WDP>4=3.974-0.0002IKE_{WT}+0.0373(IKE_{WT})^{0.5}+0.085 \text{ Log}_{10}(IKE_{WT}) \quad \text{C3}$$

Units of $IKE_{WT}$ in C2 and C3 are Terra-joules (1 TJ=$10^{12}$ J)

Applicants added IKE calculations and the IKE damage potential ratings to experimental H*Wind analyses on Applicants' website and worked toward improving the relationship between the IKE intensity metrics and wind radii. At present, the IKE calculations are best suited to the western Atlantic basin where regular aircraft reconnaissance is available, but the relationships of IKE to wind radii will allow experimentation with IKE in forecasts and analyses in tropical cyclone basins outside the Atlantic. As used through the specification and claims, "computing" is defined as "made with the aid of a computer" as manual computation is impractical considering the amount of data necessary to form the basis for the invention.

Each of the prior art documents referred to herein and not previously incorporated by reference are expressly incorporated herein by reference as follows: Weatherford and Gray: Typhoon structure as revealed by an aircraft reconnaissance, part 1: Data analysis and climatology, Mon.Wea.Rev., Vol. 116, pages 1032-1043, 1988; Croxford and Barnes: Inner core strength of Atlantic tropical cyclones, Mon.Wea.Rev., Vol. 130, pages 127-139, 2002; Roof cladding fatigue index (Mahendran: Cyclone intensity categories. Wea. Forecasting, Vol. 13, pages 878-883, 1998); Turbulence kinetic energy dissipation (Businger and Businger: Viscous dissipation of turbulence kinetic energy in storms. J. Atmos.Sci., Vol. 58, pages 3793-3796, 2001; Power (Emanuel, supra), and Hurricane intensity and hazard indices, Kantha, supra); Nordehaus: The economics of hurricanes in the United States, NBER working paper W12813, 2006); Howard et al. The decision to seed hurricanes, Science, Vol. 176, pages 1191-1202, 1972; Wilkinson et al.: Citizens' response to warnings of hurricane Camille, Social Science Research Center are Rep. 35, Mississippi State University, 56 pp., 1970; Milletti and 0' Brien: Warnings during the disaster: Normalizing communicated risk, Social Problems, Vol. 39, pages 40-57, 1992; A. Lee, Biloxi Sun Herald, 2006 "it looks like Hurricane Camille killed more people yesterday than it did in 1969"; Powell et al.: Reduce drag coefficient for high wind speeds and tropical cyclones, Nature, Vol. 422, pages 279-283, 2003; Donelan et al.: On the limiting aerodynamic roughness of the sea in very strong winds, Geophys. Res. Lett., Vol. 31, L18306, doi: 10. 1029/2004GL019460, 2004; Cline, relations of the changes in the storm tides on the coast of the Gulf of Mexico to the center and movement of hurricanes, Mon.Wea.Rev., Vol. 48, pages 127-146, 1920); Longuet-Higgins et al.: Radiation stress in water waves, a physical discussion with application, Deep-Sea Res., Vol. 11, pages 529-563, 1964); A study of Hurricane Georges (1998) by Weaver: Effect of wave forces on storm surge, M.S. thesis, Dept. of Civil and Coastal Engineering, University of Florida, 75pp., 2004; Interagency Performance Evaluation Task Force (IPET): Performance evaluation of the New Orleans and southeast Louisiana hurricane protection system, Vol. IV, The Storm. Draft Final Report, U.S. Army Corps of Engineers, Vicksburg MS 2006; The national oceanic and atmospheric administration (NOAA)-Atlantic Oceanographic and Meteorological Laboratory (AOML) Hurricane Wind Analysis System (H*Wind; Power et al: Hurricane Andrew's landfall in south Florida. Part I: Standardizing measurements for documentation of surface wind fields, Wea. Forecasting, Vol. 11, pages 304-328, 1996 and Powell et al.: The HRD real-time hurricane wind analysis system, J. Wind Eng. Ind. Aerodyn., Vols. 77-78, page 53-64, 1998) Blending the Shapiro: The asymmetric boundary layer flow under a translating hurricane, J. Atmos. Sci. Vol. 40, pages 1984-1998, 1983; H*Wind archive are each expressly incorporated herein by reference.

Applicants encourage scientists and engineers from multiple disciplines to build on our approach to help the world reach an improved understanding of tropical cyclone Impacts. Gridded wind fields are available for experimentation toward refining measures of the wind and surge destructive potential.

It is to be understood that this disclosure will enable other scientists to predict the effect of tropical storms before landfall is made and will better permit the population to make decisions whether to leave or stay in the affected area. Communication to selected zip codes of the findings in the intensity of tropical storms according to the invention will aid that process together with better risk damage analysis, preparation and allocation of rescue resources and efforts.

Figure 8:
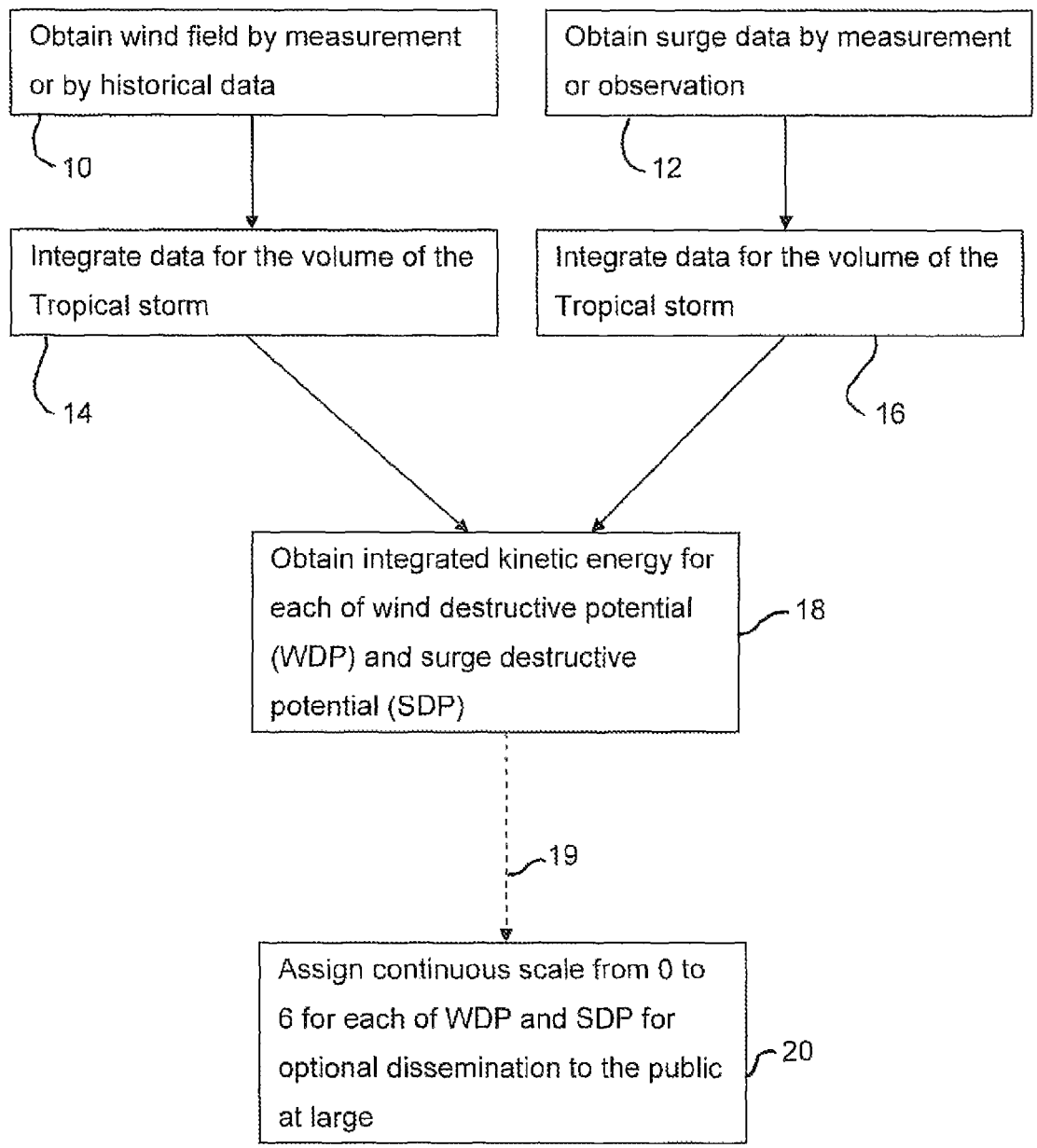
FIG. 8 is a flow diagram of a method of determining the Powell/Reinhold Scales.

FIG. 8 is a flow diagram summarizing the steps to obtain wind field 10 by measurement or by historical data; and to obtain surge data 12 by measurement or observation. Each of wind field 10 and surge data 12 are integrated, respectively, at 14, 16 over the volume of the tropical storm. The kinetic energy from each of wind destructive potential (WDP) and surge destructive potential (SDP) are obtained 18. This result can be used directly, or if the public is to be optionally notified (as indicated by dotted line 19) a continuous scale 20 from 0 to 6 for each of WDP and SDP is assigned.

However, it is to be understood that the foregoing disclosure is by way of example only and that changes in the implementation may be made without departing from the spirit and scope of the invention.

Computing IKE, $W_{DP}$, and $S_{DP}$ from Operational Wind Radii and Intensity

IKE quantities (TJ) are estimated from the H*Wind $V_{MS}$ (m/s) and the quadrant average of reported wind radii (km) listed in H*Wind graphical products (Table 1). Quadrants without wind radii or quadrants over land were not included in the radii averages. Any negative IKE, $W_{DP}$, or $S_{DP}$ computations should be constrained to zero.

| | | |
|---|---|---|
| If $V_{MS} \geq 18$ m/s <br> $IKE_{TS} = 46.42 + 0.352 \, R_{18} + 0.0007$ <br> $(R_{18} - 305.97)^2 + 0.187 \, R_{33} - 0.004$ <br> $(R_{33} - 113.15)^2$ | ($r^2 = 0.93, n = 23$) | (A1) |
| If $V_{MS} \geq 25$ m/s <br> $IKE_{25-40} = 23.3 + 0.05 \, R_{18} + 0.245 \, R_{26}$ | ($r^2 = 0.91, n = 23$) | (A2) |
| If $V_{MS} \geq 33$ m/s <br> $IKE_H = -25.2 + 0.238 \, V_{MS} + 0.023$ <br> $(V_{MS} - 55.87)^2 + 0.235 \, R_{33} -$ <br> $5.5 \times 10^{-4} (R_{33} - 113.15)^2 + 0.025 \, R_{18}$ | ($r^2 = 0.90, n = 23$) | (A3) |
| If $V_{MS} \geq 41$ m/s <br> $IKE_{41-54} = -25.7 + 0.4 \, V_{MS} - 0.022$ <br> $(V_{MS} - 56.9)^2 + 0.085 \, R_{33} + 0.097 \, R_{max}$ | ($r^2 = 0.73, n = 22$) | (A4) |
| If $V_{MS} \geq 55$ m/s <br> $IKE_{55} = -28.96 + 0.43 \, V_{MS} + 0.036$ <br> $(V_{MS} - 64.9)^2 + 0.024 \, R_{33}$ <br> $W_{DP}$ and $S_{DP}$ estimated from wind radii and $V_{MS}$ as described above. | ($r^2 = 0.98, n = 10$) | (A5) |
| If $V_{MS} < 55$ m/s; <br> $W_{DP<4} = 0.047 + 0.015 \, R_{33} - 5.98 \times$ <br> $10^{-5} (R_{33} - 119.74)^2 + 0.008 \, R_{max}$ | ($r^2 = 0.91, n = 15$) | (A6) |
| If $W_{DP<4} > 4.0$, SET $W_{dp<4} = 3.99$ <br> If $V_{MS} \geq 55$ m/s; <br> $W_{DP>4} = -0.778 + 0.078 \, V_{MS} + 0.008$ <br> $R_{33} - 9.01 \times 10^{-5} (R_{33} - 100.79)^2$ | ($r^2 = 0.99, n = 8$) | (A7) |
| If $W_{DP>4} < 4.0$, set $W_{DP>4} = 4.0$; <br> If $W_{DP>4} > 6.0$, set $W_{DP5} = 5.99$ <br> $S_{DP} = 0.959 + 0.009 \, R_{18} - 8.88 \times 10^{-6}$ <br> $(R_{18} - 305.98)^2 +$ <br> $0.005 R_{33} - 1.04 \times 10^{-4} (R_{33} - 113.15)^2$ <br> If $S_{DP} > 6.0$, set $S_{DP} = 5.99$. | ($r^2 = 0.95, n = 23$) | (A8) |

We claim:

1. A method for determining the severity of a tropical storm selected from the group consisting of hurricanes and typhoons, according to a combined Wind Destructive Potential (WDP) Scale and a Storm Surge Destructive Potential (SDP) Scale, (otherwise jointly known as the Powell/Reinhold Scale), wherein said WDP relating to structural and loading and the nonlinear nature of wind damage to residential structures;

said SDP relating to the process through which wind forces, storm surge and waves create damage;

said method comprising:

obtaining a surface wind field;

computing, with the aid of a computer, an integrated kinetic energy (IKE), in Tera Joules, (TJ), from the surface wind field by integrating 10-m-level kinetic energy per unit volume of portions of a storm domain volume (V) containing sustained surface wind speeds (U) satisfying equation (1):

$$IKE = \int_V \tfrac{1}{2}\rho U^2\, dV \qquad (1)$$

wherein $\rho$ represents air density of 1 kg/m$^3$; and, computing, with the aid of a computer, the SDP according to formula (4):

$$SDP = 0.676 + 0.43\sqrt{IKE_{TS}} - 0.0176(\sqrt{IKE_{TS}} - 6.5)^2 \qquad (4)$$

wherein $IKE_{TS}$ represents the integrated kinetic energy of (tropical storm) winds greater than 33 m/sec.

2. The method of claim 1, wherein the WDP computed for storms having winds <55 m/sec are assigned a wind destructive potential rating WDP<4, based on the sum of the damage related IKE values ($IKE_{25\text{-}40}$ to 6 $IKE_{41\text{-}54}$), wherein $IKE_{25\text{-}40}$ represents the integrated kinetic energy of winds of 25 to 40 m/sec and $IKE_{41\text{-}54}$ represents the integrated kinetic energy of winds of 41 to 54 m/sec satisfying the relationship (C2)

$$WDP<4 = .8828 + 0.0183(IKE_{WT})^{.5} + 0.802 \log_{10}(IKE_{WT}) \qquad (C2).$$

3. The method of claim 1, wherein the WDP<4 computed for storms having winds >55 m/sec are based on the contribution of the damage-weighted IKE value, 30 $IKE_{55}$ alone when $IKE_{55}$ represents integrated kinetic energy of winds >55 m/sec and satisfy the relationship (C3)

$$WDP>4 \text{ requires } V_{MS} > 5\ \text{m s}^{-1}$$

$$WDP>4 = 3.974 - 0.0002 IKE_{WT} + 0.0373(IKE_{WT})^{.5} + 0.085 \log_{10}(IKE_{WT}) \qquad (C3).$$

4. The method according to claim 1, wherein the WDP and SDP each, independently, varies continuously from 0.1 to 5.9.

5. The method of claim 4, wherein the Powell/Reinhold Scale comprises at least the following discrete relationships:

| A wind and storm surge/wave destructive potential rating for hurricanes based on integrated kinetic energy (TJ). | | | |
|---|---|---|---|
| Wind destructive potential rating | Wind damage-weighted IKE | Surge/waves destructive potential rating | Storm surge and waves IKE$_{TS}$ |
| 0.1 | 0.5 | 0.1 | 0.7 |
| 1.0 | 34.5 | 1.0 | 2.7 |
| 2.0 | 78.0 | 2.0 | 11.7 |
| 3.0 | 135.0 | 3.0 | 29.5 |
| 4.0 | 30 IKE$_{55}$ 1.1 | 4.0 | 61.0 |
| 5.0 | 30 IKE$_{55}$ 50 | 5.0 | 119.5 |
| 5.9 | 30 IKE$_{55}$ 298 | 5.9 | 260.0. |

6. The method of claim 1, wherein the step of obtaining the surface wind field is by observing horizontal distribution of winds of the storm by at least one of air-, space- land- and sea-based measurement systems.

7. The method of claim 1, wherein the surface wind field over land are converted to marine exposure.

8. The method of claim 1, including the step of accounting for localized areas susceptible to storm surge and wave damage due to at least one of coastline shape and bathymetric topography.

9. The method of claim 1, including the step of accounting for storm motion contribution to surge.

10. The method of claim 1, including the step of accounting for at least one of duration of wind intensity and variation in wind direction as the storm affects a particular location or area.

11. The method of claim 1, including the step of accounting for variations in air density.

12. The method of claim 1, including the step of accounting for the contribution of turbulence kinetic energy in generating at least one of roof suction pressures and debris missiles.

13. A method of warning the population of the risk of tropical storm damage by transmitting the results of the method of claim 1 to the population in an affected area.

14. The method of claim 13, wherein the step of transmitting the results is performed according to at least one of zip code and census tract.

15. The method of claim 13, wherein the transmitting affects the risk perception of the population in deciding whether to leave or stay in the affected area.

16. The method of claim 13, wherein the transmitting is a component of risk assessment for the affected area.

17. The method of claim 13, wherein the transmitting is a component of rescue allocation.

18. The method of claim 13, wherein the transmitting is a component of response allocation.

19. The method of claim 13, where the transmitting is a component of recovery allocation.

* * * * *